United States Patent
Sun et al.

(10) Patent No.: US 9,722,530 B2
(45) Date of Patent: Aug. 1, 2017

(54) MOTOR DRIVE CIRCUIT

(71) Applicant: Johnson Electric S.A., Murten (CH)

(72) Inventors: Chi Ping Sun, Hong Kong (CN); Fei Xin, Shenzhen (CN); Shing Hin Yeung, Hong Kong (CN); Xiu Wen Yang, Shenzhen (CN); Yun Long Jiang, Shenzhen (CN); Yan Yun Cui, Shenzhen (CN)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 14/751,756

(22) Filed: Jun. 26, 2015

(65) Prior Publication Data

US 2015/0381102 A1    Dec. 31, 2015

(30) Foreign Application Priority Data

Jun. 26, 2014  (CN) .......................... 2014 1 0299016

(51) Int. Cl.
| | |
|---|---|
| *H02P 6/00* | (2016.01) |
| *H02P 29/02* | (2016.01) |
| *F25D 17/06* | (2006.01) |
| *H02P 29/024* | (2016.01) |

(52) U.S. Cl.
CPC ............ *H02P 29/02* (2013.01); *F25D 17/062* (2013.01); *H02P 29/0241* (2016.02); *F25B 2600/112* (2013.01)

(58) Field of Classification Search
CPC .. H02P 8/36; H02P 29/02; H02P 6/085; H02P 7/04; H02P 6/24; H02P 1/18; H02P 6/20; H02P 21/34
USPC ..................................................... 318/400.29
See application file for complete search history.

(56) References Cited

U.S. PATENT DOCUMENTS

| | | | |
|---|---|---|---|
| 4,653,285 A | 3/1987 | Pohl | |
| 7,773,352 B2* | 8/2010 | Mishima | H02P 29/032 318/432 |
| 8,384,325 B2* | 2/2013 | Mishima | H02P 7/29 318/400.09 |
| 2004/0042110 A1* | 3/2004 | Takahashi | G11B 5/02 360/67 |
| 2008/0115512 A1* | 5/2008 | Rizzo | B60H 1/00428 62/134 |
| 2009/0108716 A1* | 4/2009 | Teshima | H02K 29/08 310/68 B |
| 2014/0150581 A1* | 6/2014 | Scheuring | B60J 5/047 74/89.38 |

FOREIGN PATENT DOCUMENTS

JP    H10-220932 A    8/1998

* cited by examiner

*Primary Examiner* — Bickey Dhakal
(74) *Attorney, Agent, or Firm* — Muncy, Geissler, Olds & Lowe, P.C.

(57) ABSTRACT

A drive circuit for an electric motor, has a driving source unit, configured to generate a driving source signal and a driving unit, connected to the motor and configured to drive the motor according to the driving source signal. A sensing unit senses the actual speed of the motor. A control unit stops operation of the motor when the actual speed of the motor falls below a predetermined level. A timing unit counts a predetermined time period from the time the motor stops operation. The motor resumes operation at the end of the predetermined time period.

11 Claims, 9 Drawing Sheets

MOTOR DRIVE CIRCUIT

CROSS REFERENCE TO RELATED APPLICATIONS

This non-provisional patent application claims priority under 35 U.S.C. §119(a) from Patent Application No. 201410299016.7 filed in The People's Republic of China on Jun. 26, 2014, the entire contents of which are hereby incorporated by reference.

FIELD OF THE INVENTION

This invention relates to a drive circuit for an electric motor and in particular, to a drive circuit having a re-start function.

BACKGROUND OF THE INVENTION

An evaporator is provided in a refrigerator for absorbing heat to decrease the temperature in the refrigerator. A fan is also provided in vicinity of the evaporator to circulate the air inside the refrigerator through the evaporator. In this way, the temperature in the refrigerator is more uniform. In use, humid air may enter the refrigerator when the door is open. Water may then condensate on the evaporator and form ice. As more and more ice is formed on the evaporator, there is a possibility that the ice will reach the fan causing the load on the motor of the fan to increase gradually, resulting in a rising load current of the motor and thus causing the motor and the drive circuit thereof to be over-heated and thus come damaged. In this case, the temperature of a region for storing food in the refrigerator would rise because the air is not being circulated through the evaporator.

In the conventional technology, the above issue may be addressed by connecting a safety fuse in series with the motor. When the above issue occurs, the fuse will blow to turn off the motor. However, it is troublesome to replace the fuse for subsequent use. In the conventional technology, the above issue may also be addressed by providing an electronic control device and a temperature sensor. The electronic control device determines that the fan is blocked by ice when the temperature sensed by the temperature sensor is above a certain value, and then turns off the motor. However, it may take the sensor much time to sense the change in temperature in the case that the fan blocked by ice can still operate at a relatively low speed, during which the heat generated by the motor and the electronic components is more than that in normal situations because the fan is blocked from rotating, which may result in the motor and the drive circuit thereof to be damaged.

SUMMARY OF THE INVENTION

Hence there is a desire for an improved drive circuit for a motor which is more responsive to the operation of the motor.

Accordingly, in one aspect thereof, the present invention provides a drive circuit for an electric motor, comprising: a driving source unit, configured to generate a driving source signal; a driving unit, connected to the motor and configured to drive the motor according to the driving source signal; a sensing unit, configured to sense an actual rotational speed of the motor; a control unit, connected to the sensing unit to receive the actual rotational speed and configured to cause the motor to stop operating by causing the driving unit to stop driving the motor when the actual rotational speed falls below a predetermined rotational speed; and a timing unit, connected to the control unit and configured to start timing a predetermined time period when the control unit causes the motor to stop operating, wherein the control unit causes the motor, which does not operate during the predetermined time period, to resume operating by controlling the driving unit to drive the motor, when the predetermined time period expires.

Preferably, the control unit is connected to the driving unit, and the control unit causes the driving unit to stop driving the motor by causing the driving unit to stop operating.

Preferably, the control unit is connected to the driving source unit, and the control unit causes the driving unit to stop driving the motor by causing the driving source unit to stop generating the driving source signal.

Preferably, the control unit is connected between the driving source unit and the driving unit, and the control unit causes the driving unit to stop driving the motor by stopping transmission of the driving source signal from the driving source unit to the driving unit.

Preferably, the sensing unit comprises a Hall element, a back electromotive force sensing circuit, or a circuit for sensing a current flowing through the motor, that is provided on the motor or in the vicinity of the motor.

Preferably, the control unit comprises an AND gate and inputs a low voltage level to the AND gate to stop operation of the motor; the timing unit inputs a low voltage level to the AND gate for the duration of the predetermined time period; the driving source signal is inputted to the AND gate; and the output of the AND gate is connected to the driving unit.

Preferably, the timing unit is further connected to the driving source unit; and the timing unit causes the driving source unit to stop operating for the duration of the predetermined time period.

Preferably, the control unit comprises a AND gate; the driving source signal is inputted to the AND gate; the control unit inputs a low voltage level to the AND gate to stop operation of the motor; and the output of the AND gate is connected to the driving unit.

Preferably, an additional sensing unit is provided, configured to sense the actual rotational speed of the motor; and a protecting unit, connected to the additional sensing unit and the control unit, wherein the protecting unit causes the control unit to stop the transmission of the driving source signal from the driving source unit to the driving unit when the actual rotational speed falls below the predetermined rotational speed, and causes the control unit to resume the transmission when the predetermined time period expires.

Preferably, the timing unit is further connected to the driving source unit; the control unit comprises a first AND gate and a second AND gate; each of the control unit and the protecting unit inputs a low voltage level to the first AND gate when the actual rotational speed falls below the predetermined rotational speed; the output of the first AND gate is inputted to the second AND gate; the driving source signal is inputted to the second AND gate; the output of the second AND gate is connected to the driving unit; and the timing unit controls the protecting unit to input a high voltage level to the first AND gate when the predetermined time period expires.

Preferably, the control unit comprises a first AND gate and a second AND gate; the control unit and the protecting unit input low voltage levels to the first AND gate and the second AND gate respectively when the actual rotational speed falls below the predetermined rotational speed; the output of the first AND gate is inputted to the second AND gate; the driving source signal is inputted to the first AND gate; the output of the second AND gate is connected to the driving unit; and the timing unit controls the protecting unit to input a high voltage level to the second AND gate when the predetermined time period expires.

Preferably, the driving unit comprises a bridge driving circuit connected to the motor and a driver for driving the bridge driving circuit; and the sensing unit comprises a shunt resistor and a capacitor that are connected in series to each other and are connected between a first power supply of the bridge driving circuit and ground.

Preferably, the control unit further includes a comparator and two resistors, wherein the two resistors are connected in series between a second power supply and ground; the comparator has a positive input connected to a node between the two resistors, a negative input connected to a node between the shunt resistor and the capacitor, and an output connected to the timing unit; and a low voltage level signal outputted from the comparator represents that the actual rotational speed of the motor has fallen below the predetermined rotational speed.

According to a second aspect, there is provided a refrigerator, comprising: an evaporator; and a fan, located in the vicinity of the evaporator and configured to generate an air stream flowing through the evaporator, wherein the fan comprises a motor, a blade driven by the motor, and the drive circuit described above for driving the motor.

According to a third aspect, there is provided a motor module, comprising: a motor, comprising a stator and a rotor rotatably coupled to the stator; and a circuit board fixed to the stator and comprising the drive circuit described above for driving the motor.

According to a fourth aspect, there is provided a refrigerator, comprising: an evaporator; and a fan, located in the vicinity of the evaporator and configured to generate an air stream flowing through the evaporator, wherein the fan comprises a blade and the motor module described above for driving the blade.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The motor drive circuit of the present invention is for driving or operating an electric motor, and includes a driving source unit, a driving unit, a sensing unit, a control unit and a timing unit. The driving source unit is configured to generate a driving source signal. The driving unit is connected to the motor and configured to operate the motor according to the driving source signal. The sensing unit is configured to sense an actual rotational speed of the motor. The control unit is connected to the sensing unit to receive the actual rotational speed and configured to cause the motor to stop operating by causing the driving unit to stop driving the motor when the actual rotational speed has fallen below a predetermined rotational speed. The timing unit is connected to the control unit and configured to start counting or timing a predetermined time period when the control unit causes the motor to stop operating, and cause the motor, which does not operate during the predetermined time period, to resume operating by causing the driving unit to drive the motor through the control unit, when the predetermined time period expires.

In this way, when the rotational speed of the motor decreases to a certain extent due to an external force applied to the motor, the driving circuit stops the motor, preventing the motor or the electronic components for the motor from being damage through over-temperature because of the reduction in the rotational speed. In addition, the driving circuit will restart the motor when the predetermined time period expires. If the external force disappears, the motor restores to normal operation and if the external force still exists, the driving circuit stops the motor again, and the above procedure is repeated till the external force disappears and the motor restores to normal operation. In this way, the motor does not need to be restarted manually. In the following, the motor drive circuit of the present invention is described in detail with reference to multiple embodiments.

First Embodiment

Figure 1:
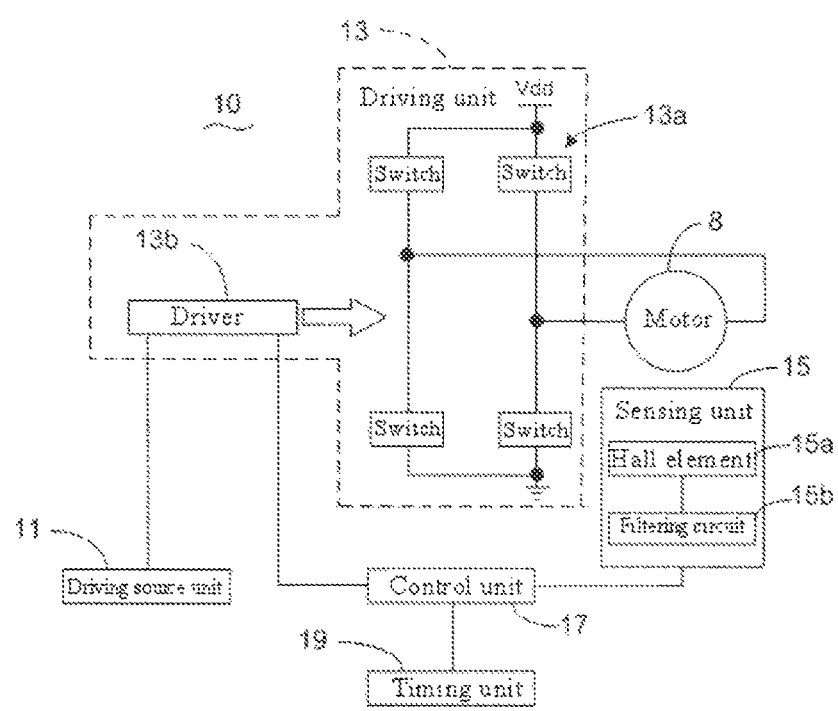
FIG. 1 is a schematic diagram of a motor driving circuit according to a first embodiment of the present invention.

A schematic diagram of a motor drive circuit according to a first embodiment of the present invention is shown in FIG. 1. In the embodiment, a motor drive circuit 10 is driving a motor 8, and includes a driving source unit 11, a driving unit 13, a sensing unit 15, a control unit 17 and a timing unit 19. The driving source unit 11 is configured to generate a driving source signal, which is a pulse width modulation (PWM) signal in the embodiment. The present invention is not limited to a PWM signal, and the driving source signal may take other forms. The driving unit 13 includes a driver 13b and a full bridge driving circuit 13a having four switches. The driver 13b is connected to the driving source unit 11 and may control the rotational direction and rotational speed of the motor 8 by controlling the on-off sequence and on-off frequency of the individual switches under the control of the driving source signal such as the PWM signal, and thus drive the motor 8. As can be understood, the present invention is not limited to the full bridge driving circuit 13a and can include in another embodiment other types of driving circuit, such as a half bridge driving circuit.

The sensing unit 15 includes a Hall sensor or Hall element 15a provided on the motor 8 or in the vicinity of the motor 8. The Hall element 15a generates a sensing signal by sensing variations in the magnetic field of the motor as the motor rotates. The sensing signal represents an actual rotational speed of the motor 8. Optionally, the sensing unit 15 may further include a filtering circuit 15b for filtering the sensing signal representing the actual rotational speed. The Hall element and the corresponding filtering principle and the way for setting the Hall element to sense the actual rotational speed of the motor are well known in the art, and will not be described in detail.

The control unit 17 is connected to the sensing unit 15 for receiving from the sensing unit 15 the sensing signal representing the actual rotational speed of the motor 8, and comparing the sensing signal to a predetermined signal representing a predetermined rotational speed of the motor 8. If the comparison result indicates that the actual rotational speed of the motor 8 has fallen below the predetermined rotational speed (for example, the voltage value of the sensing signal being greater than a predetermined voltage value), the control unit 17 causes the driving unit 13 to stop driving the motor 8 by causing the driver 13b to stop operating. At the time when the control unit 17 causes the motor 8 to stop operating, the timing unit 19 connected to the control unit 17 starts timing a predetermined time period, during which the motor 8 stays turned off. At the time when the predetermined time period expires, the timing unit 19 causes the driver 13b to resume operating through the control unit 17, and thus the motor 8 is driven to resume operating (turned on). If the comparison result indicates that the actual rotational speed of the motor 8 is not less than the predetermined rotational speed, the control unit 17 does not perform any action that may affect the normal operation of the motor 8 and the motor 8 does not change its operating state (i.e. it remains turned on).

Because the Hall element 15a accurately senses the actual rotational speed of the motor 8, the driving circuit 10 may stop the motor 8 in time when the actual rotational speed decreases to a certain extent due to an external force applied to the motor 8, preventing the motor 8 or electronic components thereon from being possibly over-heated and thus damaged. In addition, the control unit 17 will restart the motor 8 after the predetermined time period. If the external force disappears, the rotational speed will not decrease, and thus the motor 8 returns to normal operation; and if the external force still exists, the control unit 17 stops the motor 8 again, and the above procedure is repeated till the external force disappears and the motor 8 returns to normal operation. In this way, the motor 8 does not need to be restarted manually.

Second Embodiment

Figure 2:
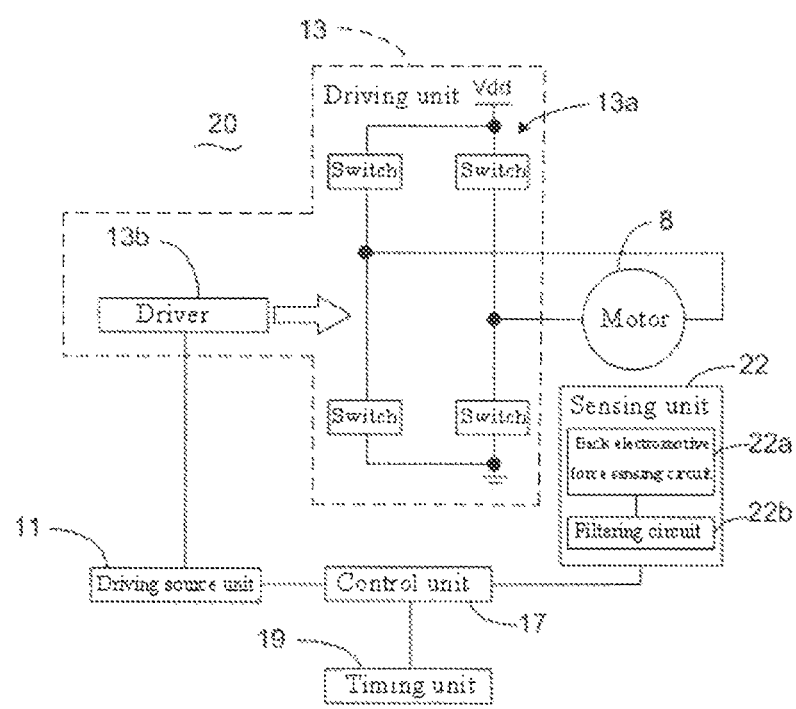
FIG. 2 is a schematic diagram of a motor driving circuit according to a second embodiment of the present invention.

FIG. 2 illustrates a schematic diagram of a motor drive circuit according to a second embodiment of the present invention. The differences between the motor drive circuit 20 of the second embodiment differs and the motor drive circuit 10 of the first embodiment, lies in the sensing unit and the relationship between the driver 13b, the driving source unit 11 and the control unit 17. The sensing unit 22 of the second embodiment includes a back electromotive force (BEMF) sensing circuit 22a provided on the motor 8 or in the vicinity of the motor 8. Preferably, the sensing unit 22 further includes a filtering circuit 22b. BEMF refers to an electromotive force generated due to the tendency of a current flowing through a coil to resist change, which occurs at the moment when a coil is energized or de-energized. The BEMF sensing circuit 22a is configured to sense the BEMF of the motor 8, and thus generate a corresponding sensing signal. The filtering circuit 22b is configured to filter the sensing signal. The BEMF sensing circuit and the corresponding filtering principle and the way for setting the BEMF sensing circuit to sense the actual rotational speed of the motor are well known in the art, which will not be described in detailed here.

In addition, as compared with the motor drive circuit 10 of the first embodiment, the control unit 17 in the second embodiment is connected to the driving source unit 11, and the driving source unit 11 is connected to the driver 13b. During the operation, if the comparison result obtained by the control unit 17 indicates that the actual rotational speed of the motor 8 is less than the predetermined rotational speed, the control unit 17 causes the driving unit 13 to stop driving the motor 8 by causing the driving source unit 11 to stop operating. At the time when the control unit 17 causes the motor 8 to stop operating, the timing unit 19 connected to the control unit 17 starts timing a predetermined time period, during which the motor 8 stays in the non-operating state. At the time when the predetermined time period expires, the timing unit 19 causes the driving source unit 11 to resume operating through the control unit 17, and thus the motor 8 is driven to resume operating. Similarly, if the comparison result indicates that the actual rotational speed of the motor 8 is not less than the predetermined rotational speed, the motor 8 does not change its operating state.

Third Embodiment

Figure 3:
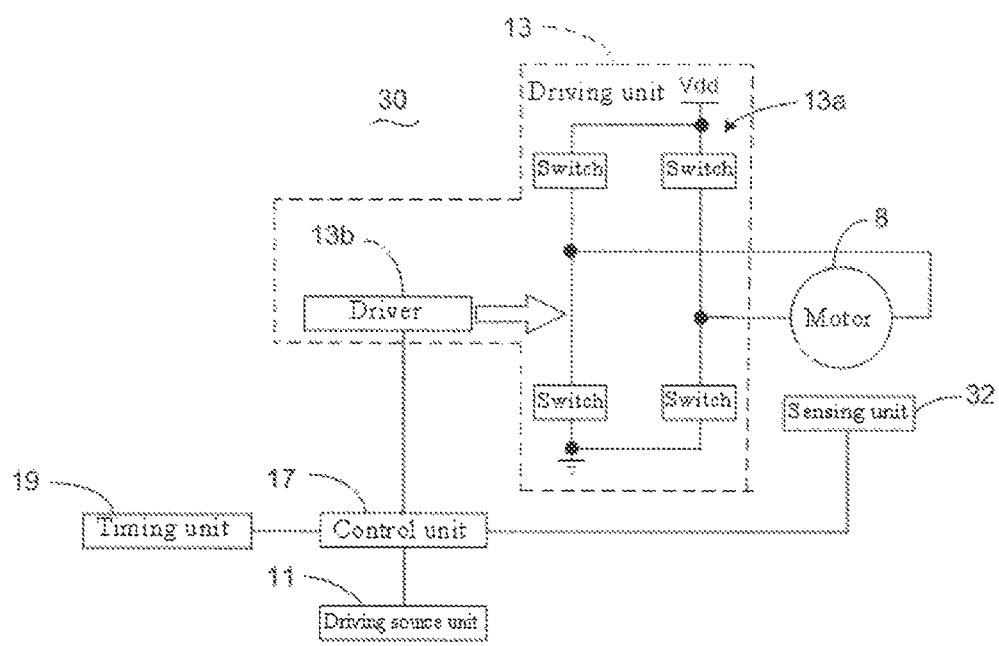
FIG. 3 is a schematic diagram of a motor driving circuit according to a third embodiment of the present invention.

Referring to FIG. 3, a schematic diagram of a motor driving circuit according to a third embodiment of the present invention is shown. The motor drive circuit 30 of the third embodiment differs from the motor driving circuit 10 of the first embodiment in the sensing unit and the connection between the driver 13b, the driving source unit 11, the timing unit 19 and the control unit 17. The sensing unit 32 is configured to sense the current flowing through the motor 8. Since the magnitude of the load is in proportion to the current flowing through the motor 8, the current flowing through the motor 8 may represent the load of the motor 8. A bigger load on the motor leads to a lower rotational speed and a larger current.

In addition, the control unit 17 is connected to each of the driver 13b, the driving source unit 11, the timing unit 19 and the sensing unit 32. During operation, if the comparison result obtained by the control unit 17 indicates that the actual rotational speed of the motor 8 has fallen below the predetermined rotational speed, the control unit 17 causes the driving unit 13 to stop driving the motor 8 by stopping or cutting off the transmission of the driving source signal generated by the driving source unit 11 to the driver 13b. At the time when the control unit 17 causes the motor 8 to stop operating, the timing unit 19 connected to the control unit 17 starts counting or timing a predetermined time period, during which the timing unit 19 causes the motor 8 to stay in the off state by causing the control unit 17 to cut off or stop the transmission of the driving source signal generated by the driving source unit 11 to the driver 13b. At the time when the predetermined time period expires, the timing unit 19 and the control unit 27 cancel the cutoff (resumes transmission of the driving source signal), and thus the motor 8 is driven to resume operating. Similarly, if the comparison result indicates that the actual rotational speed of the motor 8 is not less than the predetermined rotational speed, the motor 8 does not change its operating state.

Figure 4:
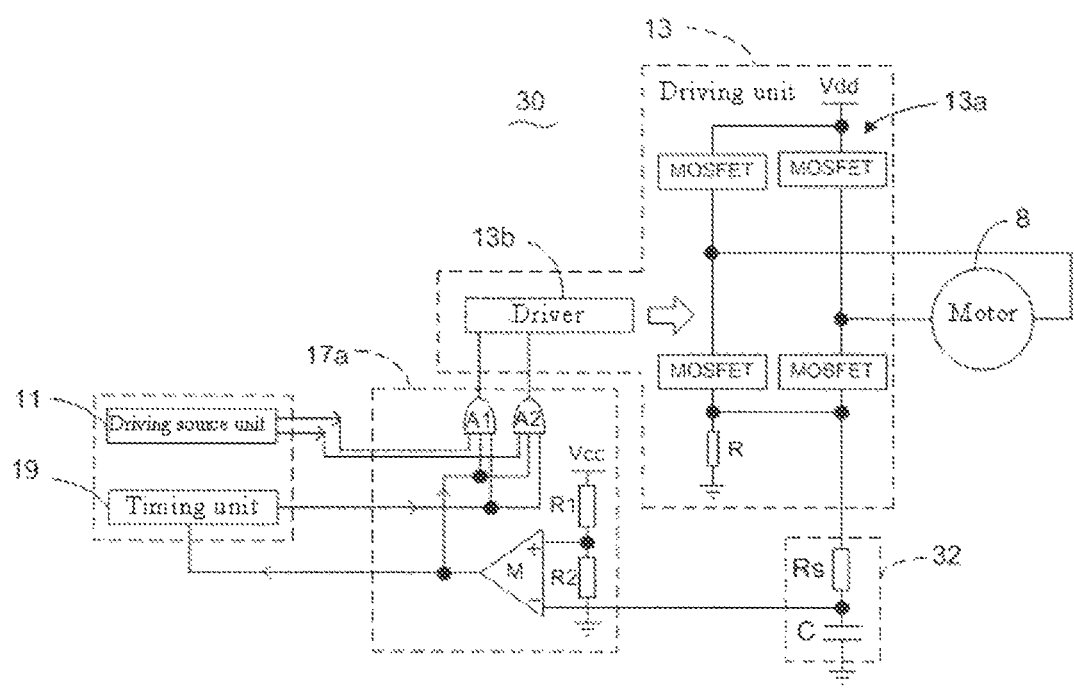
FIG. 4 is a circuit diagram of an implementation of the circuit in FIG. 3.

FIG. 4 shows a circuit diagram of an implementation of the circuit of FIG. 3. The driving source unit 11 is implemented as a PWM signal source having two outputs with opposite phases. The PWM signal source may be integrated with the timing unit 19 in an integrated circuit, such as a single chip microcomputer. Thus the waveform of the PWM signal and the predetermined time period counted by the timing unit 19 may be adjusted by respective programs. The full bridge driving circuit 13a of the driving unit 13 has one end connected to a positive power supply Vdd, and the other end grounded through a ground resistor R. The sensing unit 32 and the resistor R are connected in parallel to each other and grounded. The sensing unit 32 includes a shunt resistor Rs for detecting the current flowing through the motor and a capacitor C for filtering the voltage signal from the shunt resistor Rs, which are connected in series to each other. Thus, the shunt resistor Rs and the capacitor C constitute a low-pass filter, and the voltage input to the negative input end of the comparator M is equal to the voltage across the capacitor C. Each of the four switches of the full bridge driving circuit 13a is implemented as a field-effect transistor (MOSFET). The control unit 17a includes the comparator M, two resistors R1 and R2, and two AND gates A1, A2. The resistors R1 and R2 are connected in series between the positive power supply Vcc and ground, constituting a voltage divider circuit. The comparator M has the positive input end connected to a node between the resistors R1 and R2, and the negative input end connected to a node between the shunt resistor Rs and the capacitor C. Each of the AND gates A1 and A2 has three inputs, which are connected respectively to a PWM signal source of the driving source unit 11, the output end of the comparator M and the timing unit 19. The output end of each of the AND gates is connected to the driver 13b controlling the four MOSFETs.

When the rotational speed of the motor 8 decreases to a certain extent due to an external force applied to the motor 8, the current flowing through the motor 8 increases, and the current flowing through the shunt resistor Rs and the capacitor C increases correspondingly. When the voltage at the node between the shunt resistor Rs and the capacitor C is greater than a voltage at the node between the resistors R1 and R2, the comparator M outputs a low voltage level to the two AND gates A1 and A2. At this point, the output of each of the AND gates A1 and A2 is a low voltage level no matter whether other inputs of the AND gates A1 and A2 are high voltage levels or low voltage levels. In this case, the control unit 17a stops the transmission of the PWM signal to the driver 13b such that the individual MOSFETs are switched off and the motor 8 stops operating. The low voltage level outputted by the comparator M is also inputted to the timing unit 19, causing the timing unit 19 to start timing a predetermined time period, for example, 60 seconds. During the predetermined time period, the timing unit 19 also keeps outputting a low voltage level to the AND gates A1 and A2 to maintain the cutoff of the PWM signal. After the motor stops operating, no current flows through the shunt resistor Rs and thus the comparator M outputs a high voltage level. However, because of the timing unit 19, the PWM signal is cut off till the predetermined time period expires. After the predetermined time period expires, the timing unit 19 outputs a high voltage level to unlock the two AND gates A1 and A2, and thus the motor 8 resumes operating.

With the embodiment, the actual rotational speed of the motor 8 is sensed only by one shunt resistor Rs, leading to a simple circuit structure and a lower cost. In addition, the circuit stops the transmission of the PWM signal to the driver 13b in a manner of hardware, i.e., using two AND gates, leading to more reliable operation. It should be understood that the driving source unit 11 in other embodiments may have one or more than two PWM signal output (s), which may be modified as different circuit requirements.

Fourth Embodiment

Figure 5:
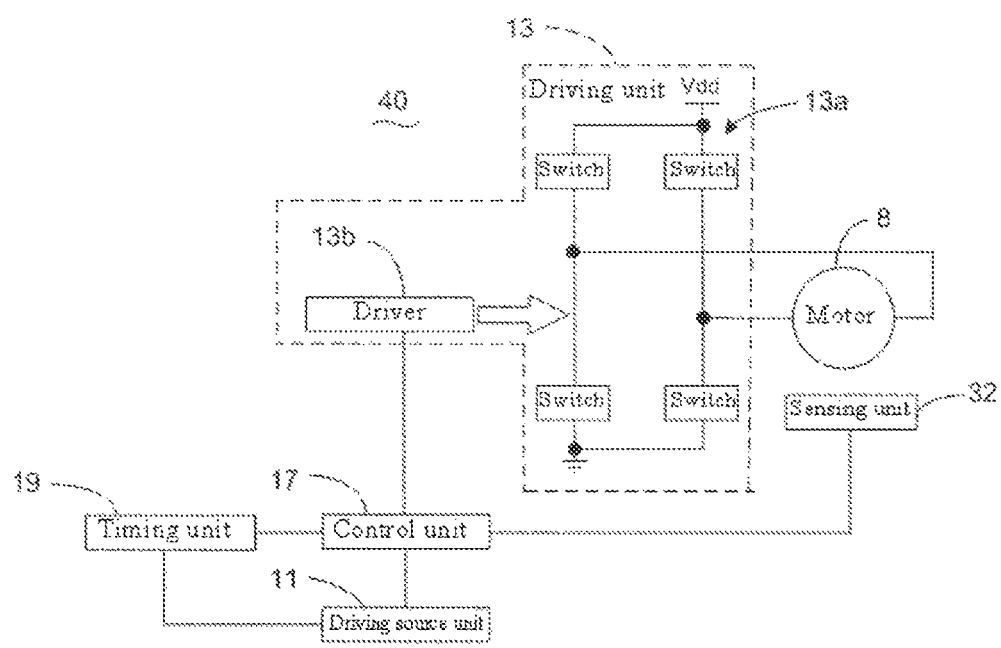
FIG. 5 is a schematic diagram of a motor driving circuit according to a fourth embodiment of the present invention.

A schematic diagram of a motor drive circuit according to a fourth embodiment is shown in FIG. 5. The motor drive circuit 40 of the fourth embodiment differs from the motor drive circuit 30 of the third embodiment in that the timing unit 19 is further connected to the driving source unit 11 for controlling the driving source unit 11 to stop generating PWM signals at the time when the control unit 17 causes the driving unit 13 to stop driving the motor 8. Thus, the motor 8 keeps in the non-operating state even if the control unit 17 cancels the cutoff after the motor 8 is stopped as not driven by the driving unit 13.

Figure 6:
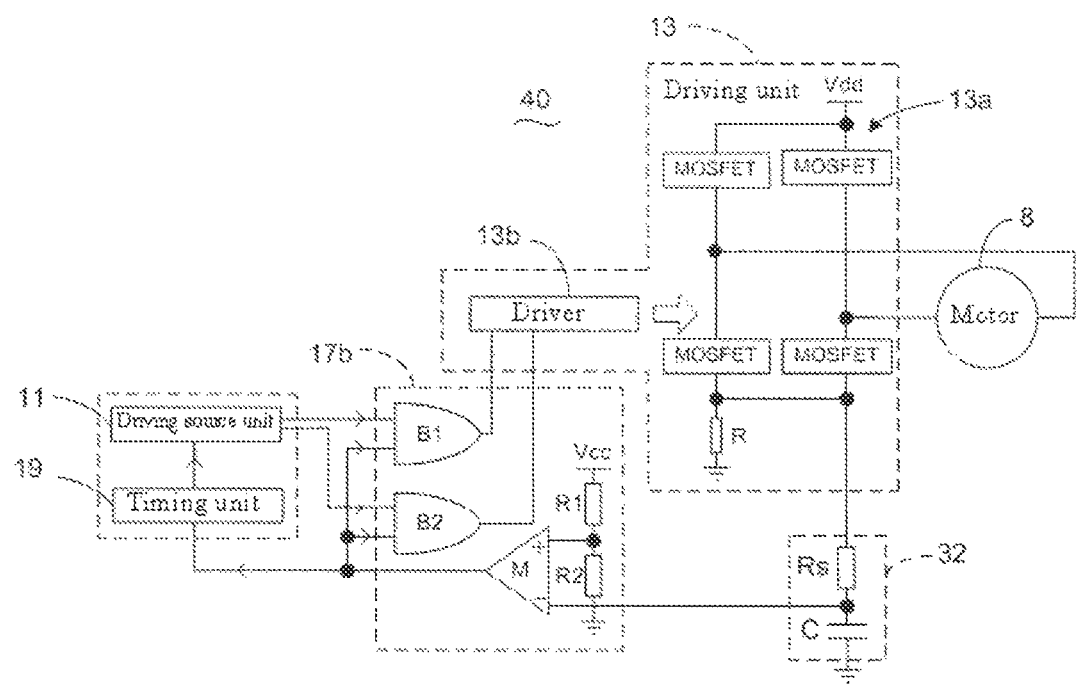
FIG. 6 is a circuit diagram of an implementation of the circuit in FIG. 5.

A circuit diagram of an implementation of the circuit of FIG. 5 is shown in FIG. 6. The circuit diagram is similar to that shown in FIG. 4, only differing in that the timing unit 19 is further connected to the driving source unit 11, and each of two AND gates B1 and B2 of the control unit 17b has two inputs without being connected to the timing unit 19. When the rotational speed of the motor 8 decreases to a certain extent due to an external force applied to the motor 8, which causes the comparator M to output a low voltage level to the two AND gates B1 and B2, the control unit 17 causes the motor 8 to stop operating by cutting off or stopping the transmission of the PWM signal to the driver 13b through the two AND gates B1 and B2. At this time, a low voltage level outputted by the comparator M is transmitted to the timing unit 19 to cause the timing unit 19 start timing the predetermined time period, during which the timing unit 19 causes the driving source unit 11 to stop generating PWM signals. After the motor 8 stops operating, no current flows through the shunt resistor Rs and thus the comparator M outputs a high voltage level to unlock the two AND gates B1 and B2. After the predetermined time period expires, the timing unit 19 causes the driving source signal to be transmitted to the driving unit to resume the operation of the motor 8.

Fifth Embodiment

Figure 7:
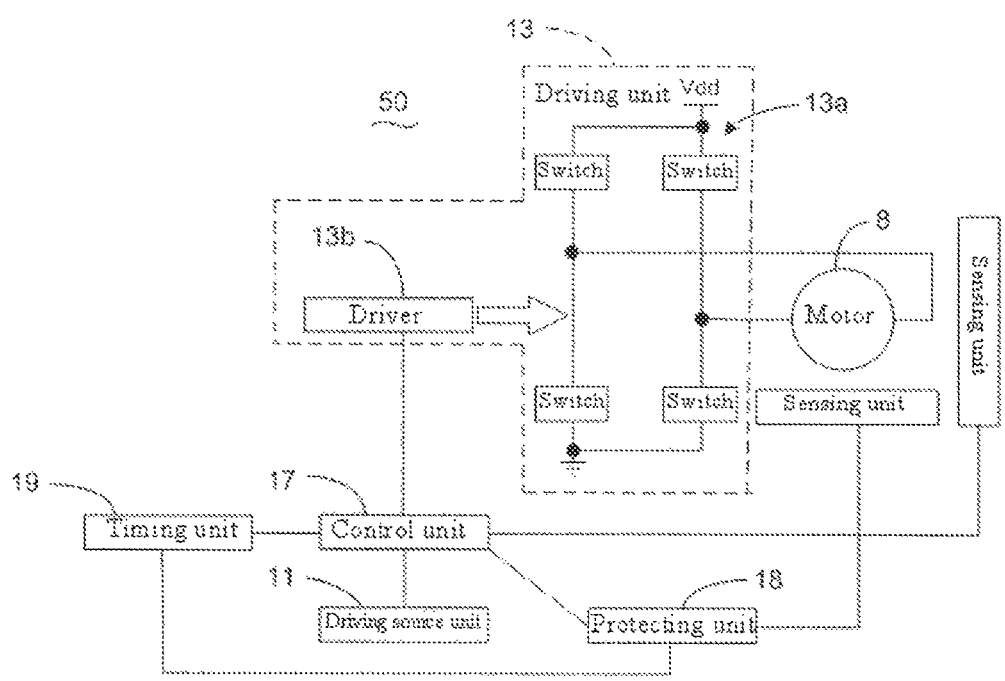
FIG. 7 is a schematic diagram of a motor driving circuit according to a fifth embodiment of the present invention.

FIG. 7 is a schematic diagram of a motor drive circuit 50 according to a fifth embodiment. The motor drive circuit 50 of the fifth embodiment differs from the motor drive circuit 40 of the fourth embodiment in that the motor drive circuit 50 includes two sensing units each configured to sense the rotational speed of the motor, i.e., a first sensing unit and a second sensing unit (which is referred to as an additional sensing unit), and also includes a protecting unit 18. The timing unit is not connected to the driving source unit. The first sensing unit is connected to the control unit 17 and plays a role as those sensing units do in the above embodiments. The additional sensing unit is connected to the protecting unit 18, and is configured to cause the control unit 17 to keep cutting off the transmission of the PWM signal to the driving unit 13 at the time when the control unit 17 causes the driver 13b to stop driving the motor 8.

Figure 8:
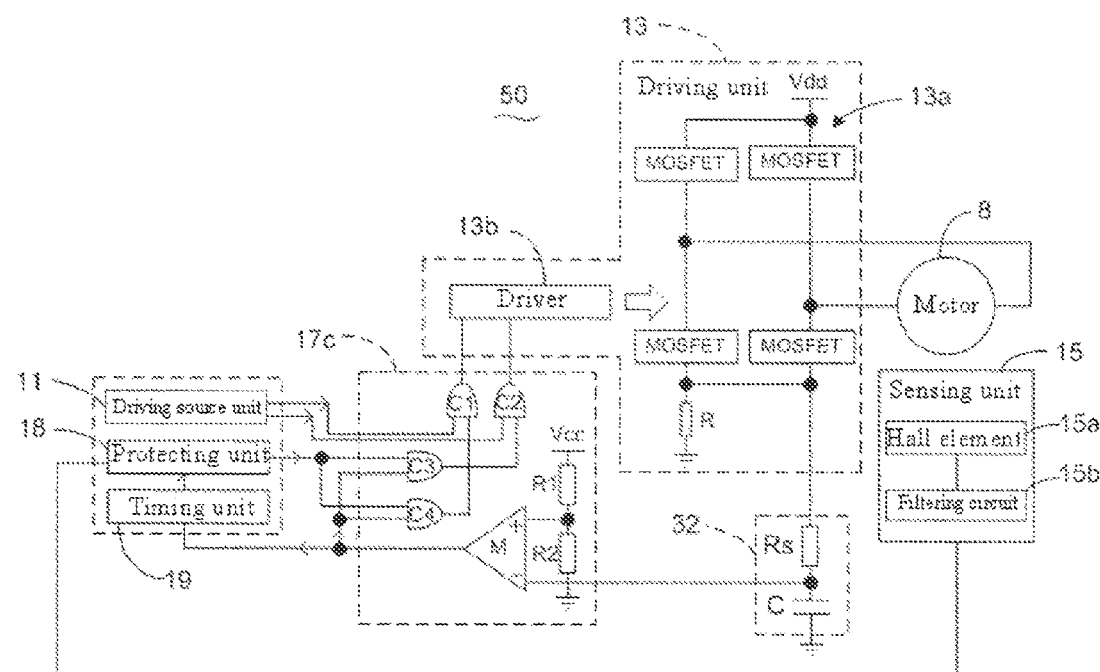
FIG. 8 is a circuit diagram of an implementation of the circuit in FIG. 7.

FIG. 8 shows a circuit diagram of an implementation of the circuit in FIG. 7. The circuit diagram in FIG. 8 is similar to that in FIG. 6, and differing only in that the circuit diagram in FIG. 8 further includes an additional sensing unit 15 using a Hall element 15a and a protecting unit 18, and the control unit 17c further includes two AND gates C3 and C4 in addition to two AND gates C1 and C2. In the embodiment, the sensing unit is implemented as the sensing unit 32 in the third embodiment, and the additional sensing unit is implemented as the sensing unit 15 in the first embodiment. As can be understood, the sensing units of individual embodiments may be interchanged. For example, the first sensing unit and the additional sensing unit in the present embodiment may be interchanged. The output of the comparator M is connected to input ends of the timing unit 19 and the AND gates C3 and C4. The output of the sensing unit 15 is connected to the protecting unit 18, and the output of the protecting unit 18 is connected to input ends of the AND gates C3 and C4. Input ends of the AND gates C1 and C2 are connected to the PWM signal of the driving source unit 11 and the outputs of the AND gates C3 and C4 respectively.

During operation the rotational speed of the motor 8 is sensed by the two sensing units 15 and 32. When the rotational speed of the motor 8 decreases to a predetermined rotational speed due to an external force applied to the motor 8, the comparator M outputs a low voltage level to the two AND gates C3 and C4, causing the two AND gates C3 and C4 to output a low voltage level to the AND gates C1 and C2. In this case, the control unit 17c cuts off the transmission of the PWM signal to the driver 13b and thus the motor 8 stops operating. The low voltage level outputted by the comparator M is also inputted to the timing unit 19, causing the timing unit 19 to start timing a predetermined time period, for example, 60 seconds. After receiving the rotational speed of the motor sensed by the sensing unit 15 which is less than the predetermined rotational speed, the protecting unit 18 outputs a low voltage level signal to the two AND gates C3 and C4. Thus, a dual protection is performed. After the predetermined time period expires, the timing unit 19 cancels the cutoff of the PWM signal by causing the protecting unit 18 to output a high voltage level, and thus the motor 8 resumes operating.

Figure 9:
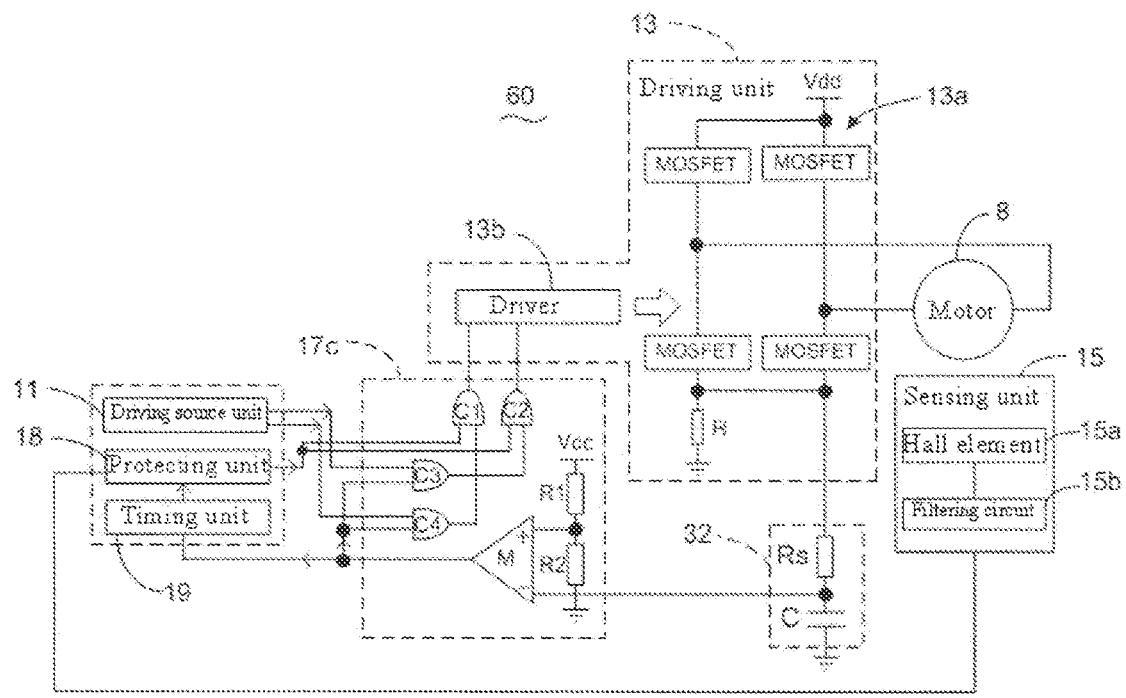
FIG. 9 is a circuit diagram of another implementation of the circuit in FIG. 7.

In order to performing the above dual protection, a circuit diagram of another implementation of the circuit in FIG. 7 may be as a drive circuit 60 shown in FIG. 9, which differs from the drive circuit in FIG. 8 in that the outputs of the driving unit 11 are inputted to the AND gates C3 and C4 respectively, and the outputs of the protecting unit 18 are inputted to the AND gates C1 and C2 respectively. The principle of operation is almost the same as above and will not be repeated herein.

Application

Figure 10:
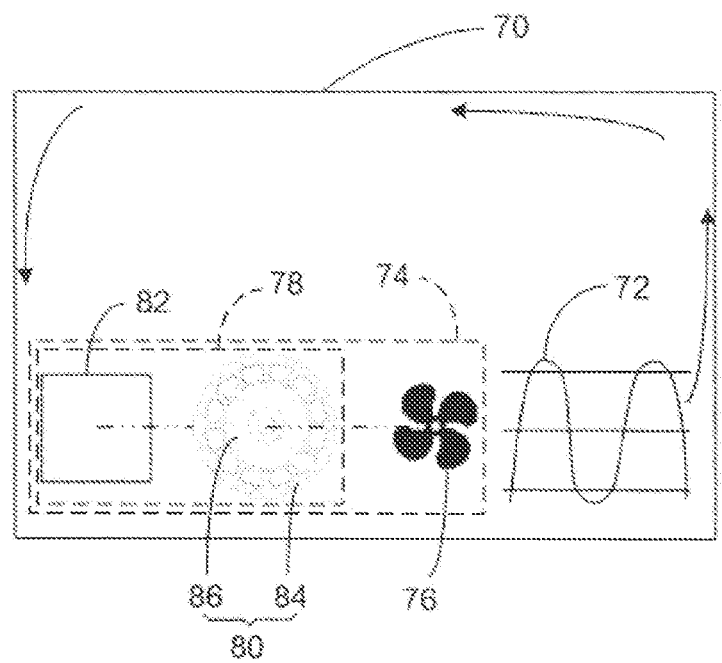
FIG. 10 is a schematic diagram of an evaporator and a fan in a refrigerator.

For the above functions of the drive circuits, an application applying the drive circuits may be a refrigerator, for example. As shown in FIG. 10, a refrigerator 70 includes an evaporator 72 and a fan 74. The fan 74 is located in the vicinity of the evaporator 72 and configured to generate an air stream flowing through the evaporator 72. When the air stream flows through the evaporator 72, a part of the heat of the air stream is absorbed by the evaporator 72. Thus, cool air is circulated within the refrigerator 70 to cool food in the refrigerator 70. The fan 74 includes a fan blade 76 and a motor module 78 for driving the blade 76. The motor module 78 includes a motor 80 and a circuit board 82. The motor 80 includes a stator 84 and a rotor 86 rotatably coupled to the stator 84. Although the rotor 86 is shown to be disposed in the stator 84 in the figure, i.e., in the form of an inner rotor motor, it should be understood that it is also possible to dispose the stator in the rotor in other embodiments, i.e., in a form of an outer rotor motor. The rotator 86 is connected to the blade 76 to drive the blade 76 to rotate. The circuit board 82 is fixed to the stator 84 and includes a motor drive circuit, such as the above motor drive circuit 10, 20, 30, 40, 50 or 60, for driving the motor.

In this way, during operation, the rotational speed of the motor 80 decreases if the rotation of the blade 76 of the fan 74 is blocked by the ice formed on the evaporator 72. In this case, under the action of the drive circuit, the motor 80 is suspended for a predetermined time period, for example, 60 seconds. During the time period, the ice may melt naturally or by means of heating. After the predetermined time period expires, if the ice has melted enough not to block the rotation of the blade 76, the drive circuit controls the motor 80 to resume operating; otherwise, if rotation of the blade 76 is still blocked when the motor 80 is restarted, then the above operation suspending procedure is repeated till the ice has melted enough not to block the rotation of the blade 76.

As can be understood, the sensing units in the above embodiments may be interchanged with each other without affecting the benefit of the present invention. It should be noted that although the various types of sensing units in the above embodiments sense various signals rather than sensing directly the rotational speed of the motor, it should be understood what the sensing units sense is the rotational speed of the motor. As can be understood, the above full bridge driving circuit may also be a half bridge driving circuit, both of which are bridge driving circuits capable of operating the motor. The driver should be modified correspondingly if a half bridge driving circuit is employed. Moreover, in the embodiment shown in FIG. 4, if the comparator can bear a relatively large input voltage, the negative input end of the comparator may also be connected directly between the resistor R and the MOSFETs, which may achieve the same effect. It should be noted that if it is mentioned in the present disclosure that two parts are connection, it is not excluded the case that the two parts are connected indirectly, unless it is specified that the two parts are connected directly.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A drive circuit for an electric motor, comprising:
   a driving source unit, configured to generate a driving source signal;
   a driving unit, connected to the motor and configured to drive the motor according to the driving source signal;
   a sensing unit, configured to sense an actual rotational speed of the motor;
   a control unit, connected to the sensing unit to receive the actual rotational speed and configured to cause the motor to stop operating by causing the driving unit to stop driving the motor when the actual rotational speed falls below a predetermined rotational speed; and a timing unit, connected to the control unit and configured to start timing a predetermined time period when the control unit causes the motor to stop operating, an additional sensing unit configured to cause the control unit to keep cutting off a transmission of the driving source signal from the driving source unit to the driving unit;

a protecting unit, connected to the additional sensing unit and the control unit, and wherein the protecting unit causes the control unit to stop the transmission of the driving source signal from the driving source unit to the driving unit when the actual rotational speed falls below the predetermined rotational speed, and causes the control unit to resume the transmission when the predetermined time period expires.

2. The drive circuit of claim 1, wherein the control unit is connected to the driving unit, and the control unit causes the driving unit to stop driving the motor by causing the driving unit to stop operating.

3. The drive circuit of claim 1, wherein the control unit is connected between the driving source unit and the driving unit, and the control unit causes the driving unit to stop driving the motor by stopping transmission of the driving source signal from the driving source unit to the driving unit.

4. The drive circuit of claim 1, wherein the sensing unit comprises a Hall element, a back electromotive force sensing circuit, or a circuit for sensing a current flowing through the motor, that is provided on the motor or in the vicinity of the motor.

5. The drive circuit of claim 1, wherein the timing unit is further connected to the driving source unit;

the control unit comprises a first AND gate and a second AND gate;

each of the control unit and the protecting unit inputs a low voltage level to the first AND gate when the actual rotational speed falls below the predetermined rotational speed;

the output of the first AND gate is inputted to the second AND gate;

the driving source signal is inputted to the second AND gate;

the output of the second AND gate is connected to the driving unit; and the timing unit controls the protecting unit to input a high voltage level to the first AND gate when the predetermined time period expires.

6. The drive circuit of claim 1, wherein the control unit comprises a first AND gate and a second AND gate;

the control unit and the protecting unit input low voltage levels to the first AND gate and the second AND gate respectively when the actual rotational speed falls below the predetermined rotational speed;

the output of the first AND gate is inputted to the second AND gate;

the driving source signal is inputted to the first AND gate;

the output of the second AND gate is connected to the driving unit; and the timing unit controls the protecting unit to input a high voltage level to the second AND gate when the predetermined time period expires.

7. The drive circuit of claim 1, wherein the driving unit comprises a bridge driving circuit connected to the motor and a driver for driving the bridge driving circuit; and the additional sensing unit comprises a shunt resistor and a capacitor that are connected in series to each other and are connected between a first power supply of the bridge driving circuit and ground.

8. The drive circuit of claim 7, wherein the control unit further includes a comparator and two resistors, wherein the two resistors are connected in series between a second power supply and ground;

the comparator has a positive input connected to a node between the two resistors, a negative input connected to a node between the shunt resistor and the capacitor, and an output connected to the timing unit; and a low voltage level signal outputted from the comparator represents that the actual rotational speed of the motor has fallen below the predetermined rotational speed.

9. A refrigerator, comprising: an evaporator; and a fan, located in the vicinity of the evaporator and configured to generate an air stream flowing through the evaporator, wherein the fan comprises a motor, a blade driven by the motor, and the drive circuit of claim 1 for driving the motor.

10. A motor module, comprising:

a motor, comprising a stator and a rotor rotatably coupled to the stator; and a circuit board, fixed to the stator and comprising the drive circuit of claim 1 for driving the motor.

11. A refrigerator, comprising: an evaporator; and a fan, located in the vicinity of the evaporator and configured to generate an air stream flowing through the evaporator, wherein the fan comprises a blade and the motor module of claim 10 for driving the blade.

* * * * *